Feb. 1, 1966  D. A. STONELAKE  3,233,188
AUTOMATIC FREQUENCY CONTROL FOR RADAR TEST APPARATUS
Filed June 29, 1962  2 Sheets-Sheet 1
FIG. 1
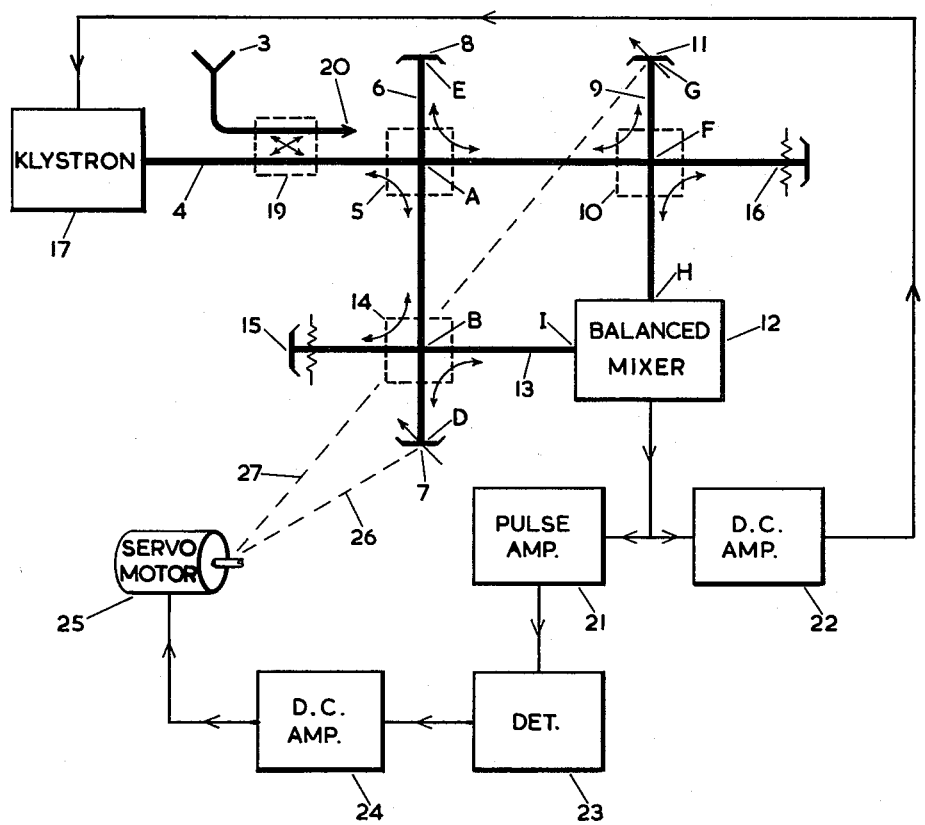
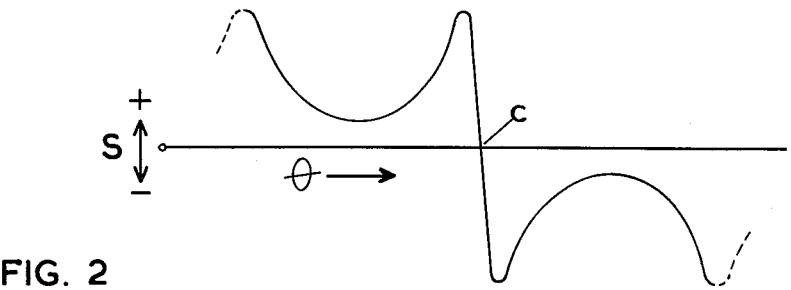
FIG. 2

Feb. 1, 1966  D. A. STONELAKE  3,233,188
AUTOMATIC FREQUENCY CONTROL FOR RADAR TEST APPARATUS
Filed June 29, 1962  2 Sheets-Sheet 2

United States Patent Office 3,233,188
Patented Feb. 1, 1966

3,233,188
AUTOMATIC FREQUENCY CONTROL FOR
RADAR TEST APPARATUS
Dennis A. Stonelake, Burlington, Ontario, Canada, assignor to Canadian Westinghouse Company Limited, Hamilton, Ontario, Canada, a company of Canada
Filed June 29, 1962, Ser. No. 206,455
5 Claims. (Cl. 331—9)

This invention relates to automatic frequency control systems and in particular to automatic frequency control systems for utilization in radar test apparatus.

In testing radar equipment, it is necessary to produce simulations of targets, these simulations are signals of specific power levels and frequency related to the frequency of the radar transmitter. In order to simulate range, it is necessary that these signals be delayed in time relative to the pulse transmitted by the radar system. Echo boxes have been used for this purpose but are not sufficiently flexible to adequately test a radar system. A more usual system therefore is to produce the test signal in an ultra-high frequency tube, for example, a klystron, tuned to a frequency related to the transmitter frequency of the radar system and for testing a pulse type radar system a pulse of the energy from the klystron is transmitted back to the radar system a certain period of time after the original transmitter pulse of the system.

It will be appreciated that the normal transmitter of a radar system uses a magnetron which is notorious for its frequency instability. As a result it is difficult to maintain a klystron frequency sufficiently precisely related to the magnetron frequency. Systems have been evolved in the past which receive the transmitter frequency, mix it with a local oscillator frequency and lock the local oscillator a certain number of kilocycles off the transmitter frequency by means of an AFC circuit. To lock the klystron to the transmitter frequency however, requires that it now be locked to the local oscillator frequency. The result is a rather complex system. This system also requires that the local oscillator be tuned initially until the transmitter frequency is located.

It will also be noted that AFC systems of the prior art have one inherent disadvantage. If the characteristic of the discriminator is sufficiently steep to ensure close control of the local oscillator, then its bandwidth is so narrow as to make it incapable of searching the band automatically and causing the system to centre on the transmitter frequency. If, on the other hand, the slope of the discriminator is sufficiently low to enable searching of the band, when the precision of the system is impaired and the local oscillator is not sufficiently accurately locked to the transmitter frequency.

It is an object of this invention to provide an automatic frequency control system which locks an oscillator to an incoming frequency as long as the incoming frequency is somewhere within a relatively wide band and at the same time locks the oscillator frequency precisely to the incoming frequency.

It is a further object of this invention to provide an automatic frequency control system which normally remains at its last frequency setting and does not wander in the absence of an incoming reference frequency.

It is a further object of this invention to provide a simplified automatic frequency control for radar test apparatus.

It is a further object to provide a new and useful discriminator circuit.

These and other objects are obtained by providing a tuned circuit and an associated balanced mixer the whole of which has a characteristic of producing a D.C. output of one polarity when the input frequency is below the centre frequency of the tuned circuit and producing a D.C. output of the opposite polarity when the input frequency is above the centre frequency of the tuned circuit and at the same time providing for very steep crossover from one polarity output to the opposite polarity output at the centre frequency of the tuned circuit.

The output from this balanced mixer is used to drive a servo loop which maintains the tuned circuit adjusted precisely to the frequency of the incoming reference. Simultaneously the output from an oscillator is supplied to the system and the resultant output is used to tune the oscillator which then is tuned to the same frequency as the input frequency.

A clearer understanding of my invention may be had from a consideration of the following description in conjunction with the drawings in which:

FIGURE 1 is a block diagram of a system in accordance with my invention,

FIGURE 2 is a graphical representation of the characteristic of this system showing the D.C. output vs. frequency.

Figure 3:
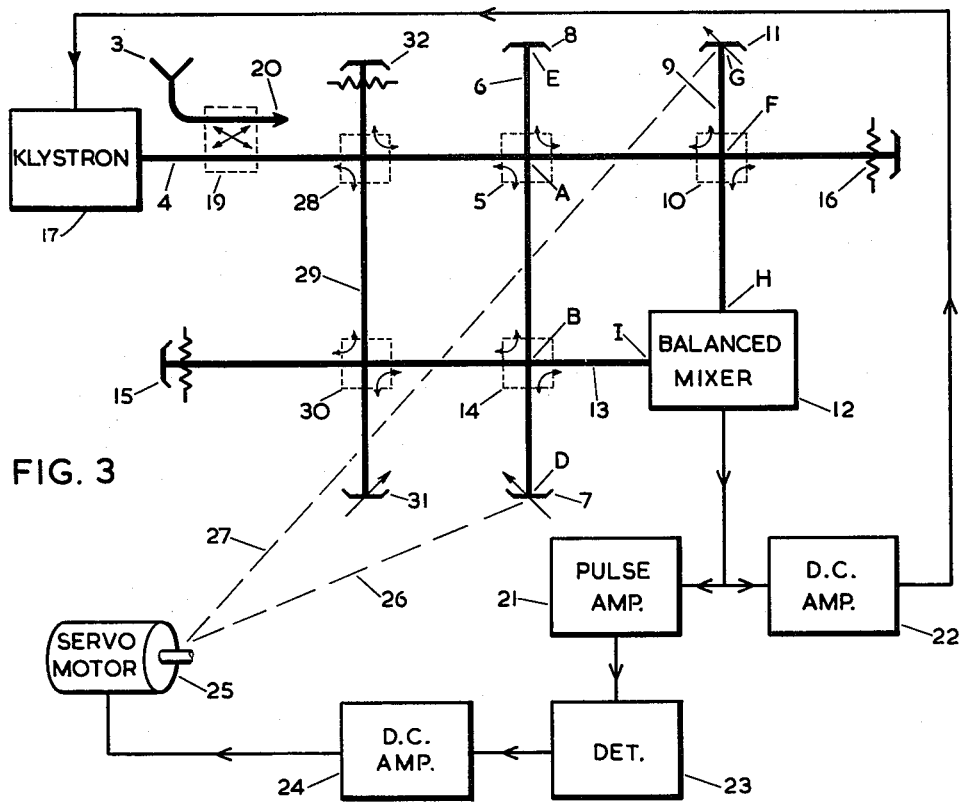
FIGURE 3 is a block schematic of a modification of the system of FIGURE 1.

Considering first FIGURE 1, there is shown an input antenna 3 which is coupled to waveguide 4 through coupler 19. This waveguide is coupled through directional coupler 5 to waveguide 6. Directional couplers have been shown as dotted squares and the preferential direction of coupling is shown by the arrows.

Figure 5:
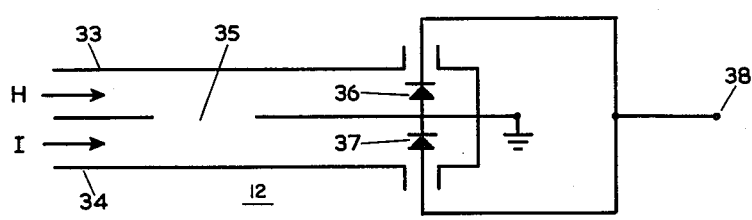
FIGURE 5 is an illustration of a portion of the systems illustrated in FIGURES 1 and 3.

One end of waveguide 6 is terminated at adjustable short circuit 7 and the other is terminated by short circuit 8. Waveguide 4 is also coupled to waveguide 9 through directional coupler 10. Waveguide 9 is terminated at one end by adjustable short circuit 11 and the other end of waveguide 9 feeds the balanced mixer 12. Waveguide 6 is also coupled to waveguide 13 through directional coupler 14. One end of waveguide 13 is terminated in the non-reflecting termination 15. The other end of waveguide 13 feeds into the balanced mixer 12. A suitable circuit for a balanced mixer is shown in FIGURE 5. Referring to FIGURES 1 and 5 a signal is applied to waveguide 33 at H. The other signal is applied to waveguide 34 at I. The two guides are intercoupled by slot 35 and the signals, combined in certain ratios and phase angles determined by the construction are applied to the diodes 36 and 37. With the arrangement as shown an output appears between terminal 38 and ground. The output of a balanced mixer is the product of two inputs.

Returning to FIGURE 1 klystron 17 feeds into waveguide 4. The end of waveguide 4 is shown with a termination 16 which represents a load. It may in practice feed power to further apparatus to provide the desired signal which may be used for testing the radar equipment. The output at 20 in the circuit as shown may be used to derive other information from the signal received by antenna 3.

From the balanced mixer 12 an output is applied to pulse amplifier 21 and D.C. amplifier 22. The output from the pulse amplifier 21 is applied to detector 23 and the output from detector 23 applied to D.C. amplifier 24. The output from D.C. amplifier 24 is applied to servo motor 25. The shaft of servo motor 25 is mechanically coupled through suitable gearing to the adjustable short circuits 7 and 11 as indicated by dash lines 26 and 27. The output from the D.C. amplifier 22 is applied to the tuned klystron 17.

The operation of the circuit may be explained as follows:

When a reference signal is applied to terminal 3, it travels down waveguide 4 and is coupled into waveguide 6. Here it is reflected back and forth between the reflecting terminations and on each transit of the waveguide, it is attenuated a certain amount depending upon the losses of this waveguide. A certain portion of this signal is coupled by directional coupler 14 to waveguide 13 and applied to the balanced mixer 12. The phase of this signal with reference to the applied signal will of course depend upon the path lengths and whether it is the first transit of the signal down waveguide 6 or the second transit, or the third, etc. A portion of the signal from waveguide 4 is also coupled through directional coupler 10 into waveguide 9. Here it is reflected from the variable short circuit 11 and directed into the balanced mixer. It should be understood that the terminations within the mixer are of course non-reflecting. The phase of this signal will depend upon path length as in the previous case. These two signals when applied to the balanced mixer will produce an output shown in FIG. 2, the characteristic of this whole circuit is such that for frequencies below the frequency designated as point C on the graph, the output from the balanced mixer is a positive voltage, while for frequencies above the point C the output from the balanced mixer is a negative voltage.

In the system being described, it is assumed that the reference frequency applied to point 3 is the pulsed output from a magnetron. The output from balanced mixer 12 therefore in response to this pulsed output, will be an impulse which is rejected by the D.C. amplifier 22 but accepted by the pulse amplifier 21. The pulses are detected and applied to D.C. amplifier 24 which in turn drives servo motor 25, the direction of servo motor 25 being determined by the polarity of the pulses applied to pulse amplifier 21. If therefore the frequency of the system is below point C, positive voltage will be applied to servo motor 25 causing it to rotate in a specific direction, and it is so related to the short circuits 7 and 11 that it drives them in a direction such that the point C is moved until it corresponds to the frequency of the reference signal. If, on the other hand, the reference signal was above the point C then the servo motor would rotate in the reverse direction again adjusting the variable short circuits 7 and 11 until point C again corresponds with the frequency of the reference.

It will be understood therefore that the balanced mixer and its associated tuned lines are automatically stabilized at the frequency of the reference signal.

It will now be noted that the output from the tuned klystron is also coupled to waveguide 4 and thence to the balanced mixer 12, in the same manner as the reference signal 3. However, the characteristic of the klystron output is different in that it is a CW output and the resultant output from the balanced mixer is separable from the resultant output from the reference signal. This separation is based upon their different character and the D.C. output produced by the signal applied from the klystron is rejected by the pulse amplifier 21 but accepted by the D.C. amplifier 22. The output from the D.C. amplifier 22 is then applied to the klystron 17 causing its frequency to be adjusted until it corresponds to point C.

Since the circuit has been adjusted to ensure that point C now corresponds with the frequency of the reference signal applied to 3, therefore the frequency of the klystron also corresponds to the reference frequency applied to point 3. The output from the klystron which appears at termination 16 may now be utilized in any manner as desired, for example, if it is intended to simulate an echo at a specific range, this output may be pulse modulated, the pulse being delayed a certain period of time after the transmitter pulse.

The characteristic curve of the system shown in FIGURE 2 will of course depend upon the lengths of the various waveguide components. In order to produce the desired type of response, it is necessary that these components be properly selected.

It will be seen that various points on the waveguide arrangement illustrated in FIGURE 1 have been given designations A, B, D, E, F, G, H, and I. In the following mathematical analysis the distance A, B, D, B, I has been designated $L_1$, A, F, G, F, H, has been designated $L_2$, E, D has been designated $L_0$ and the variation of E, D by adjustable short 7 designated $\Delta L_0$.

If the signal input at 3 is of the form $\sin \omega t$ then the signal reaching point I at the balanced mixer will be of the form:

$$i = \sin\left[wt + \frac{w}{vg}(L_1 + 2\Delta L_0)\right] + k \sin\left[wt + \frac{w}{vg}L_1 + 4\Delta L_0 + 2L_0\right] + k^{(n-1)} \sin\left\{wt + \frac{w}{vg}[L_1 + 2n\Delta L_0 + 2(n-1)L_0]\right\}$$

$$= \sum_{n=1}^{\infty} k^{(n-1)} \sin\left\{wt + \frac{w}{vg}[L_1 + 2n\Delta L_0 + 2(n-1)L_0]\right\}$$

where $vg$ equals the transmission velocity in the waveguide and $k$ equals the attenuation factor of loop E, A, B, D.

The signal reaching point H on the balanced mixer will be of the form $$h = \sin\left(wt + \frac{w}{vg}L_2\right)$$

The output of the balanced mixer will be the product of these signals and will be of the form:

$$s = h \cdot i = \sin\left(wt + \frac{w}{vg}L_2\right) \cdot \sum_{n=1}^{\infty} k^{(n-1)} \sin\left\{wt + \frac{w}{vg}[L_1 + 2n\Delta L_0 + 2(n-1)L_0]\right\}$$

Considering only low frequency terms and letting $$L_1 = L_0 + L_2 - \Delta L_0 + \frac{\lambda g}{4}$$

where $\lambda g$ is the wavelength in the waveguide and letting $$\frac{w}{vg}(L_0 + \Delta L_0) = \theta$$

Then $$S = \sum_{n=1}^{\infty} k^{(n-1)} \sin (2n-1)\theta$$

Since $k$ must be less than 1 as $n$ approaches $\infty$ and $k^n$ approaches 0 it can be shown that $$S = \frac{1/2(k+1) \sin \theta}{k^2 + 1 - 2k \cos 2\theta}$$

A plot of this function is shown in FIGURE 2 assuming a value of .8 for $k$.

The slope of this function is very steep at point C which occurs at $\theta$ equals 0, $\pi$, $2\pi$ etc. with the slope being dependent on the value of $k$.

Since $$\theta = \frac{w}{vg}(L_0 + \Delta L_0)$$

then it is evident that this can be used as a discriminator with the output S from the balanced mixer being a function of the input frequency or $\Delta L_0 1$.

Since it is desired that crossover shall occur only once in the operating band $\theta$ must equal $o$ or $\pi$ or $n\pi$ only once in the band. It can be shown that this is true if $$L_0 = \frac{vg}{\Delta f}$$

where $\Delta f$ is the bandwidth.

Changes of the crossover point are produced by adjustment of $\Delta L_0$ but in the foregoing it was assumed that $$L_1 = L_0 + L_2 - \Delta L_0 + \frac{\lambda g}{4}$$

Therefore $$L_2 = L_1 - L_0 + \Delta L_0 - \frac{\lambda g}{4}$$

hence as $\Delta L_0$ varies $L_2$ must vary which explains the necessity of adjustable short circuit 11 and its mechanical inter coupling to the servomotor.

From the foregoing it will be appreciated that by proper selection of the various waveguide lengths the characteristic of FIGURE 2 can be suitably selected and it can be ensured that a sufficient bandwidth occurs between crossover points in the characteristic to enable the servo mechanism to consistently tune the waveguide network to the same frequency as the incoming reference frequency.

An apparatus built in accordance with this invention, was designed for example to have a bandwidth of 300 megacycles approximately and the crossover at point C in FIGURE 2 is sufficiently sharp to lock the system within 50 kilocycles of the incoming reference frequency. In fact, although the circuit was not optimized, it was noted that errors were consistently less than 50 kilocycles and in some cases actual phase lock occurred between the reference signal and the frequency of the controlled klystron.

While in the system under consideration, it was assumed that the reference signal was a pulse form and that the local oscillator 17, the klystron was a continuous wave generator, alternative arrangements could exist. It is only necessary that there be characteristic difference between the locally generated oscillation and the reference frequency. Either one could be pulsed or otherwise modulated to enable selection to occur after the balanced mixer to ensure that the output resulting from each of the signals that is the reference signal and the signal from the oscillator can be separated and are properly directed into their proper channels so that the output dependent upon the reference signal is fed through the proper chain to the servo motor and the output dependent upon the oscillator is fed back to tune the klystron.

It will also be appreciated that while this system has been described in association with radar test equipment, there are other applications for such a circuit, and indeed the circuit itself without any input to point 3 is a useful stabilization circuit for an oscillator that is by omitting elements 21 and 23, 24 and 25, the circuit provides a means of locking the frequency of the klystron.

It should also be noted that since the system is tuned to the incoming reference frequency, there is no need for thermal stabilization. The only purpose such stabilization would serve would be to ensure the accuracy of the read out from variable short 7. That is, any variations in the system due to thermal drift, would not cause the system to become inoperative or create an error in its operation but would only create an error in the apparent frequency of the reference signal as read off on the calibration of the short circuit adjustment at 7.

A consideration of the circuit will also show that it has the advantage of remaining locked to its last reference frequency. Once the servo loop including servo motor 25 has adjusted the variable short 7, the system will remain at this frequency until some other signal is applied to point 3 to cause an output from the balanced mixer to thereupon readjust the servo motor.

In the absence of the signal at point 3, there is no output from the balanced mixer and no adjustment of the servo motor, the system therefore stays at its last frequency and does not drift in the absence of a reference. Similarly of course the frequency of the tuned klystron will remain fixed at the frequency determined by the rest of the system.

Figure 4:
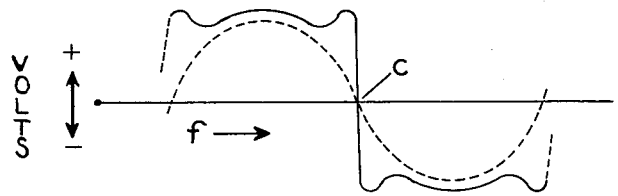
FIGURE 4 is a graphical representation of the characteristic of the system of FIGURE 3.

FIGURES 3 and 4 illustrate a modified form of my invention. The same designations have been used in FIGURES 1 and 3 and only elements 28 to 32 have been added. These elements it will be noted comprised a waveguide 29 coupled to guides 4 and 13 by directional couplers 28 and 30 and terminated at one end by termination 32 and at the other by adjustable short 31. It may be shown mathematically and will be found experimentally that when this additional coupling is added and tuned to the centre of the operating band a further term is added to the mathematical expression for S. This term is a sinusoid as shown in dotted lines in FIGURE 4 and the resultant is the sum of this term and the previous expression as shown in FIGURE 4.

This arrangement has the advantage over the previous arrangement of separating the intermediate portions of the curve from the zero axis. In operation this eliminates the possibility of inadvertently producing a false indication under conditions where a slight misadjustment of the system might otherwise cause the intermediate portion of the curve to cut the zero axis.

The design of systems in accordance with FIGURE 1 or FIGURE 3 will of course be based on the preceding mathematical analysis but as a matter of convenience the following points are emphasized. The centre frequency of the system is determined by the total length of line 6 in accordance with the formula $$f = \frac{nvg}{2}(L_0 + \Delta L_0)$$

The bandwidth of the discriminator, that is the frequency spacing between adjacent null points is given by $$\Delta f = \frac{vg}{L_1 - L_2 + \Delta L_0} - \frac{\lambda g}{4}$$

The actual lengths of $L_2$ and $L_1$ are undetermined and may be selected as convenient, the important factor is the difference in these two lengths.

In the system of FIGURE 3 the length transmission line 29 is established in the same manner as the length of transmission line 6.

While these systems have been described in association with lines having adjustable short circuits, it will be understood that other means may be used to accomplish the same end. For example phase changers in the transmission lines can produce an effect electrically equivalent to a change in length.

The embodiments of the invention in which an exclusive property or privilege is claimed are defined as follows:

1. A frequency discriminator comprising a first transmission line reflectively terminated at each of its ends, and adjustable in length, a balanced mixer radio frequency supply means, means to apply radio frequency energy from said supply means to said first transmission line means to derive radio frequency energy from said first transmission line and apply it as a first input to said balanced mixer including radio frequency energy reflected only once from one of said terminations and raido frequency energy reflected from both of said terminations, a second transmission line of adjustable length, means to apply radio frequency energy from said supply means to said second transmission line, means to derive radio frequency energy from said second transmission line and apply it as a second input to said balanced mixer with a phase determined by the length of said second transmission line and means to derive from said balanced mixer a signal representative of the product of said first and second inputs.

2. A frequency discriminator comprising a first transmission line of length $$L_0 = \frac{2f}{nvg}$$

where $vg$ is the velocity of propagation in the transmission line, $n$ is any whole number and $f$ is the centre frequency of the discriminator, reflectively terminated at each of its ends and adjustable in length, a balanced mixer, radio frequency supply means, means to apply radio frequency energy from said supply means to said first transmission line, means to derive radio frequency energy from said first transmission line and apply it as a first input to said balanced mixer including radio frequency energy reflected only once from one of said terminations and radio frequency energy reflected from both of said terminations, a second transmission line of adjustable length means to apply radio frequency energy from said supply means to said second transmission line, a second input to said balanced mixer with a phase determined by the length of said second transmission line and means to derive from said balanced mixer a signal representative of the product of said first and second inputs.

3. A frequency discriminator comprising a first transmission line of length $$L_0 = \frac{2f}{nvg}$$

where $vg$ is the velocity of propagation in the transmission line, $n$ is any whole number and $f$ is the centre frequency of the discriminator, reflectively terminated at each of its ends and adjustable in length, a balanced mixer, radio frequency supply means, means to apply radio frequency energy from said supply means to said first transmission line, means to derive radio frequency energy from said first transmission line and apply it as a first input to said balanced mixer including radio frequency energy reflected only once from one of said terminations and radio frequency energy reflected from both of said terminations, and providing a path length $L_1$ from said radio frequency supply means to said balanced mixer, a second transmission line of adjustable length $L_2$, a second input to said balanced mixer such that $$L_1 - L_2 = L_0 + \frac{\lambda g}{4}$$

where $\lambda g$ equals the wavelength in the guide and means to derive from said balanced mixer a signal representative of the product of said first and second inputs.

4. A frequency control system comprising an oscillator constituting a source of radio frequency energy, a first transmission line of length $$L_0 = \frac{2f}{nvg}$$

where $vg$ is the velocity of propagation in the transmission line, $n$ is any whole number and $f$ is the centre frequency of the discriminator, reflectively terminated at each of its ends and adjustable in length, a balanced mixer, radio frequency supply means, means to apply radio frequency energy from said supply means to said first transmssion line, means to derive radio frequency energy from said first transmission line and apply it as a first input to said balanced mixer including radio frequency energy reflected only once from one of said terminations and radio frequency energy reflected from both of said terminations, a coupling from said first transimission line at a point intermediate its end providing a path length $L_1$ from said coupling from said source of radio frequency energy for a first input to said balanced mixer, a second transmission line of adjustable length $L_2$ coupled between said source of radio frequency at the same point as said first transmission line and said balanced mixer providing a second input to said balanced mixer such that $$L_1 - L_2 = L_0 + \frac{\lambda g}{4}$$

where $\lambda g$ equals the wavelength in the guide and means to derive from said balanced mixer a signal representative of the product of said first and second inputs, and tuning means for said oscillator controlled by said signal whereby the frequency of said oscillator is essentially equal to the centre frequency of said discriminator.

5. A frequency control system for maintaining the frequency of an oscillator equal to a reference frequency said oscillator having a first modulation characteristic, said reference frequency having a second modulation characteristic, including a frequency discriminator comprising a first transmission line reflectively terminated at each of its ends, and adjustable in length, a balanced mixer, radio frequency supply means, means to apply radio frequency energy from said supply means to said first transmission line, means to derive radio frequency energy from said first transmission line and apply it as a first input to said balanced mixer, a second transmission line of adjustable length, means to apply radio frequency energy from said supply means to said second transmission line, a second input to said balanced mixer and means to derive from said balanced mixer a signal representative of the product of said first and second inputs, said radio frequency supply means comprising the output of said oscillator and said reference frequency, selective means connected to the output of said discriminator to separate said output into first and second control signals in accordance with the modulation characteristics of the output of said oscillator and said reference frequency, said first control signal being dependent upon the frequency of said oscillator, said second control signal being dependent upon said reference frequency, tuning means controlled by said first signal for varying the frequency of said oscillator, tuning means controlled by said second signal for varying the lengths of said first and second transmission lines.

References Cited by the Examiner

UNITED STATES PATENTS 3,099,803  7/1963  Unger _____ 331—9

ROY LAKE, *Primary Examiner.*

ALFRED L. BRODY, *Examiner.*